United States Patent [19]

Alexander

[11] Patent Number: 4,832,793

[45] Date of Patent: May 23, 1989

[54] PROCESS FOR EXTRUDING AND ACID TREATING CLAY FOR IMPROVED COLOR DEVELOPMENT IN CARBONLESS COPY PAPER

[75] Inventor: William Alexander, Naperville, Ill.

[73] Assignee: American Colloid Company, Arlington Heights, Ill.

[21] Appl. No.: 161,727

[22] Filed: Feb. 29, 1988

Related U.S. Application Data

[63] Continuation-in-part of Ser. No. 7,713, Jan. 28, 1987.

[51] Int. Cl.$^4$ .............................................. D21H 3/66
[52] U.S. Cl. .................................................. 162/181.8
[58] Field of Search ............................ 162/135, 181.8; 106/416, 468, 486, 484; 502/80, 81

[56] References Cited

U.S. PATENT DOCUMENTS 4,125,411 11/1978 Lyons .................................. 106/486
4,451,440 5/1984 Thompson ......................... 106/486

*Primary Examiner*—Peter Chin
*Attorney, Agent, or Firm*—Mason, Kolehmainen, Rathburn & Wyss

[57] ABSTRACT

A method of extruding clay and then treating the clay with acid to beneficiate the clay for increased color development potential when included in carbonless copy paper. The clay is first extruded through one or more die openings to align some of the clay platelets and to form the clay into cylindrical pellets. The extruded clay pellets then are acid treated, either before or after grinding, in an aqueous acid solution to form an acid slurry of the clay. The acid slurry of the clay is agitated for a time sufficient and at a temperature sufficient so that the acid reacts with a portion of the clay and, thereafter, the acid treated clay is separated from the acid solution; the clay then is washed to remove most of the acid solution from the clay; filtered and thereafter dried.

16 Claims, No Drawings

PROCESS FOR EXTRUDING AND ACID TREATING CLAY FOR IMPROVED COLOR DEVELOPMENT IN CARBONLESS COPY PAPER

CROSS REFERENCE TO RELATED APPLICATION

This application is a continuation-in-part of application Ser. No. 7,713, filed Jan. 28, 1987.

FIELD OF THE INVENTION

The present invention is directed to a process for beneficiating the clay for increased color development potential by extruding the clay through one or more die openings prior to acid treating the clay. The extruded, acid treated clay is used for color development in carbonless copy paper and is unexpectedly superior to acid treated clays which have not been extruded prior to acid treatment.

BACKGROUND OF THE INVENTION AND PRIOR ART

Impact or pressure-sensitive carbonless transfer papers ordinarily have their back surfaces coated with microscopic capsules containing a reactive, colorless liquid capable of producing a mark when reacted with a front surface component of a lower, receiver sheet. The receiver sheet, placed in contact with the back face of the top sheet, has its front surface coated with a material having a component reactive with the contents of the capsules from the top sheet, so that when the capsules are ruptured upon impact by a stylus or machine key, the initially colorless or substantially colorless contents of the ruptured capsules spill out to contact and react with the surface reactant on the front (top) of the receiver sheet. Thus, a mark is formed on the receiver sheet corresponding to the mark impressed by the stylus or machine key on the top sheet.

In the art, impact transfer papers are designated by the terms CB, CFB and CF, which stand respectively for "coated back", "coated front and back" and "coated front". The C sheet is usually the top sheet and the one on which the impact impression is directly made; the CFB sheets are the intermediate sheets, each of which also transmits the contents of ruptured capsules from its back surface to the front of the next succeeding sheet; and the CF sheet is the last sheet and is only coated on its front surface to have an image formed thereon. The CF sheet is not normally coated on its back surface as no further transfer is desired.

While it is customary to coat the capsules on the back surface and to coat the coreactant for the capsules' contents on the front surface of each sheet, this procedure could be reversed, if desired. With some prior art systems, coatings are not used at all and the coreactive ingredients are carried in the sheets themselves, or one may be carried in one of the sheets and the other may be carried as a surface coating. Further, the reactants may both comprise microencapsulated liquids. Patents illustrative of many of the various kinds of systems which may incorporate such co-reactive ingredients and which may be used in the production of manifolded transfer papers include, for example, U.S. Pat. Nos. 2,299,695 to Green, 2,712,507 to Green, 3,016,308 to Macauley, 3,429,827 to Ruus and 3,720,534 to Macauley et al.

The most common variety of carbonless impact transfer paper, and the type with which the present invention is particularly useful, is the type illustrated, for example, in Green (U.S. Pat. No. 2,712,507) and Macauley (U.S. Pat. No. 3,016,308) wherein microscopic capsules containing a liquid fill comprising a solution of an initially colorless chemically reactive color forming dye precursor are coated on the back surface of the sheet, and a dry coating of an acid treated clay, reactive with the dye precursor, and extruded and acid treated in accordance with the present invention, is coated on the front surface of a receiver sheet.

It is well known that many naturally occurring clays may be acid treated to enhance their ability to develop color in carbonless copy paper. One of the most common clays used in this field is bentonite clays, particularly the non-water swelling bentonite clays such as calcium and magnesium bentonites. These acid activated bentonite clays are used for developing a color in carbonless copy paper systems as described in the following U.S. Pat. Nos.: 4,381,120; 4,221,690; 4,118,247; 4,111,461; 4,071,646; 4,042,412; 4,040,648; 4,028,133; 3,993,500 and 3,619,238.

The general process of acid activation of clays, as used today in industry, includes grinding the clay for uniform activation and dispersion in water; slurrying the ground clay in water and then adding acid to the clay slurry in an attempt to achieve a substantially uniformly activated clay. Usually about 6 to 8 hours of acid digestion is necessary to properly acid activate the clay. The digested slurry then is washed substantially free of dissolved salts such as iron and aluminum sulfates or chlorides, depending upon the particular mineral acid used. The acid activated clay then is dewatered, such as by filtration, and the resulting filter cake is dried and subsequently ground to product specifications.

SUMMARY OF THE INVENTION

In brief, the present invention is directed to a method of treating clay to beneficiate the clay for increased capacity of color development in carbonless copy paper, by first extruding the crude clay, generally having a moisture content of about 20-40% by weight, through one or more die openings, to form clay pellets, and thereafter acid treating the clay. The extruded clay can be acid treated in the form of pellets and thereafter dried and ground to a predetermined particle size distribution or the clay pellets can be ground prior to acid treatment.

In accordance with one embodiment of the present invention, the extruded clay, before or after acid treatment, is ground to a particle size distribution such that more than 50% by weight of the clay, on a dry basis, passes through a 200 mesh screen and less than 5% by weight of the clay, on a dry basis, is finer than 5 microns. Any method of extrusion and acid treatment are suitable in accordance with the principles of the present invention. In accordance with one embodiment of the present invention, after extrusion, the extruded clay is directly contacted with an acid solution to form an acid slurry of the clay. The extruded acid treated clay slurry is agitated for a time sufficient and at a temperature sufficient so that the acid reacts with a portion of the extruded clay and thereafter the acid treated clay is separated from the acid solution; the clay then is washed to remove most of the acid solution from the clay; filtered to a liquid content less than about 60% by weight and thereafter dried, for example, to a liquid content less than about 20% by weight.

Accordingly, an object of the present invention is to provide a process for the treatment of clay to increase the capacity of the clay for color development, particularly when incorporated into carbonless copy paper as a coating during manufacture of the paper.

Another object of the present invention is to provide a new and improved process including extruding clay to partially align and break up the clay platelets and thereafter acid treating the clay to beneficiate the clay for color development characteristics.

Another object of the present invention is to provide a new and improved process for extruding and thereafter acid treating clay by contacting extruded clay directly with an acid solution, without first dispersing the clay in water, while mechanically, gently agitating the clay in the acid solution to prevent further reduction of the clay particle size.

A further object of the present invention is to provide a new and improved process for extrusion and acid treatment of clay wherein, after extrusion, the clay is initially ground to a particle size so that more than 50% of the clay particles pass through a 200 mesh screen and less than 5% of the clay particles are less than 5 microns in size and initially contacting the ground clay with an acid solution containing 10–35% by weight acid while the clay is relatively dry (less than 20% by weight water) such that initial hydration of the clay in the acid solution causes diffusion of acid, with the water, into the inner pores of the partially broken away clay platelets resulting from extrusion to more effectively acid activate the clay particles throughout.

Still another object of the present invention is to provide a new and improved process for the extrusion and then acid activation of clay to provide a clay having excellent color development properties with a relatively small percentage of clay fines, e.g., finer than 10 microns, while providing better acid activation, due to extrusion, with relatively little agglomeration of particles, thereby providing a more uniform development of color when the acid-treated clay is incorporated into a carbonless copy paper, while providing faster and easier washing and filtration of the acid activated clay during processing.

Another object of the present invention is to provide a new and improved method of treating clay by extrusion to partially separate the clay platelets followed by acid activation to beneficiate the color development characteristics of the clay by providing proper grinding of the clay to prevent a substantial portion of fine particles less than about 5 microns, and contacting the extruded ground clay particles while in relatively dry form with an acid solution containing hydrochloric acid at a concentration of about 10 to about 25% by weight, or sulphuric acid at a concentration of about 12 to 35% by weight to fix the particle size of the clay and provide immediate diffusion of acid into the interstices of the partially separated clay particles.

Another object of the present invention is to provide a new and improved method of acid activating clay particles by heating the extruded clay particles in ground or pellet form in acid solution to achieve faster mass transfer between the clay and the acid solution and to achieve faster washing and filtration of the acid activated clay particles during processing. When the clay is acid activated in pellet form, the clay is ground after acid activation to provide a desired particle size distribution for incorporation into carbonless copy paper.

Still another object of the present invention is to provide a new and improved method of acid activating clay including extruding the clay and thereafter grinding the clay particles and contacting the ground clay particles with an acid solution at a clay moisture content of less than about 20% by weight, such that hydration of the clay particles diffuses acid into the inner portions of the extruded, ground clay particles thereby substantially fixing the particle size distribution of the clay particles.

The above and other objects and advantages of the present invention will become apparent from the following detailed description of the preferred embodiment.

DETAILED DESCRIPTION OF THE PREFERRED EMBODIMENT

The process of the present invention is useful with any of the clays known to be used in carbonless copy paper, such as any of the bentonites, including swelling bentonites such as sodium bentonites or the non-swelling bentonites such as calcium magnesium bentonite. The process is also useful for clays dominated by high contents of smectite type clay minerals, such as any of the montmorillonites, nontronite and saponite, illite and hydrous-mica types of clay minerals, halloysite, and slaking-type bentonites. The process does not appear to be useful on kaolinite dominated clay deposits. The resulting extruded and acid activated clays are unexpectedly superior in color development when used in a carbonless copy paper capability and in ease and speed of filtration and washing compared to acid activated clays which have not been extruded prior to acid activation.

In accordance with a preferred embodiment of the present invention, the raw material is derived from the so-called sub-bentonite or slaking-type bentonites which contain high levels of smectite clay, such as montmorillonite, nontronite, saponite or beidellite clay minerals wherein the predominant base exchange ions are calcium and/or magnesium ions and/or hydrogen ions. Sodium bentonite is composed of layers, sheets or platelets (crystals) with the exchangeable cation occurring between the layers. The layers (crystals) are randomly oriented in crude clay particles. Extrusion, such as disclosed in the Simons U.S. Pat. No. 2,231,328, has been used to rupture the structure of the clay particle while the clay particles are moist by subjecting the particles to sufficient shear forces, thereby breaking the clay particles along various randomly oriented shear planes corresponding to the flat plate structure of the bentonite particles.

In accordance with the present invention, it has been found, unexpectedly, that by extruding the clay through one or more die openings prior to acid activation, the color development capacity of the acid activated clay is substantially improved by first aligning the flat plates of the clay structure in parallel relationship, perpendicular to the axis of the die opening and breaking apart some of the clay platelets for more efficient and effective acid activation. Apparently, it is this alignment that separates flat clay plates from each other to produce the unexpected increase in color development effectiveness discovered in accordance with the present invention.

The clay thus extruded in accordance with the present invention, exits from the die opening in pellet form having some of the flat plates of the clay structure aligned perpendicular to the longitudinal axis of the pellet and partly separated. The pellets break off from the exit end of the die opening when the pellet increases in length sufficiently to provide enough weight that the pellet breaks at the die opening exit due to the increasing pellet weight.

The extrusion of the clay, prior to acid activation in accordance with the present invention is conveniently carried out by using either a pug mill or an auger extruder. Pug mills have been commonly used in the production of bricks and other ceramic materials. In general, conventional pug mills include a tubular housing having one end open for receiving clay materials and the other end closed with an exit or die for extruding the clay material therethrough. The extruder may include cutting blades as disclosed in this assignee's prior U.S. Pat. No. 4,462,470, although the cutting blades are not necessary to achieve the new and unexpected color development effectiveness and unexpected ease in filtration and washing. The amount or intensity of shearing forces imparted by the extrusion, in accordance with the present invention, readily may be varied by changing the feed rate of bentonite, or the size of the extruding or die opening. Also, the rotation speed of the central axis driving the mixing or auger blades may be varied to change shearing forces. The particular operating conditions and pug mill dimensions may be varied widely.

Application of shear pressure forces also conveniently may be applied utilizing a conventional auger extruder. Auger extruders are similar to pug mills except that the central rotating axis has a single or double screw type mixing blade which, when rotated in the appropriate direction, mixes and conveys the bentonite toward and then through one or more die openings at the extruding end of the extruder housing. As with the pug mill, the particular dimensions, including the extruder port or die hole size and shape and operating conditions, may be varied widely to provide the bentonite with differing degrees of clay platelet alignment and separation.

The most convenient way to regulate the degree of clay platelet alignment on the bentonite is to change the size of the exit or extruder port. By varying the amount or flow rate of bentonite flowing through the extruder port, the degree of clay platelet alignment and separation can be regulated to desired levels.

Generally, the moisture content of the clay should be in the range of 15–40% by weight when the clay is extruded. If the clay is too dry, it would be forced through the die openings in a powdery form without sufficient platelet alignment and separation and, therefore, insufficient improvement in removal of oil-soluble colorant compounds. If too wet when extruded, the clay becomes very sticky and may very well clog the extruder.

As mined, bentonite generally contains anywhere from 20 to 40 or 45% water. In accordance with one embodiment of the present invention, the extruded bentonite pellets are dried so that it only contains 5 to 20 weight % moisture and thereafter it may be acid activated in pellet form or it may be ground to a desired particle size prior to acid activation.

Most known clay deposits in the United States contain about 30% or more water and are mined in the form of large, irregular chunks of soft, dense material difficult to grind or pulverize. The large chunks of clay generally are passed through a large dry-pan crusher to divide the chunks into a coarse granular product having a maximum particle size of about 2 centimeters. This material is more easily transported and charged to an appropriate drier for removal of the moisture to a level of about 8 to about 20% by weight water. The material can be dried to a moisture content less than about 8% by weight but further drying is uneconomical and unnecessary.

To achieve the full advantage of the present invention, when the clay is ground after extrusion prior to acid activation it has been found that the clay material, after extrusion and prior to grinding to an appropriate particle size distribution, should not have a moisture content greater than about 20% by weight in order to achieve grinding to the appropriate particle size distribution. In accordance with one important embodiment of the present invention, the extruded clay pellet material, pre-dried to 20% by total weight or less moisture is ground, before or after acid activation, to a particle size of about 10 to about 100 microns with most of the particles being in the range of 10–74 microns. In accordance with an important feature of this embodiment of the present invention, the clay particles should be ground such that more than 90% of the resulting particles pass through a 200 mesh screen (74 microns) and 5% or less of the particles are finer than 5 microns. To achieve the full advantage of this embodiment of the present invention, less than 1% of the ground clay particles should be finer than 5 microns.

It has been found, in accordance with the principles of one embodiment of the present invention, that grinding such that at least 95%, dry weight basis, of the ground clay particles have a particle size in the range of 5 to 100 microns; wherein less than 2% of the clay particles, dry weight basis, have a particle size greater than 100 microns and less than 3%, dry weight basis, have a particle size less than 5 microns, provides for unexpected ease in filtration, washing and color development effectiveness. In accordance with a preferred embodiment, proper grinding of the extruded clay, before or after acid activation, coupled with contact of the ground, dry (less than 20% water) clay particles with an acid solution containing 10–35% by weight acid enables the clay particles to be fixed in particle size distribution proportional to that achieved in the grinding process while achieving an acid activated clay having substantially faster absorption of acid and substantially faster filtering and washing characteristics during processing.

In accordance with a preferred embodiment of the present invention, after extruding the clay, as described above, the clay pellets or appropriately ground clay particles having less than 20% by weight water, are then gradually added, in their pre-dried form, to an agitated solution of acid, at an initial temperature of about to 25° to 75° C., and thereafter heated to 80° to 100° C. for complete acid activation, having an acid concentration of 10–35% by weight to achieve relatively fast diffusion of the acid into the pores of the ground clay particles. It is understood that any method of acid activation of clay is unexpectedly improved by extruding the clay prior to acid activation in accordance with the present invention. The particular acid in the acid solution is not critical and may be sulphuric, hydrochloric, nitric, phosphoric, or any other acid in the art.

In accordance with an important feature of the preferred embodiment of the present invention, the acid, determined on a 100% acid basis, is included in the activation solution in an amount of 10 to 35% by weight acid and, to achieve the full advantage of the present invention, the acid concentration will vary depending on the acid in solution. It has been found that hydrochloric and nitric acids, when used as the acid for the acid activation solution, should be present in the solution in an initial concentration in the range of 10 to 25% by weight acid and usually in the range of about 12 to 20% by weight acid. Best results with hydrochloric or nitric acids are achieved at an acid concentration of about 15% by weight. It has been found that when sulphuric acid is used as the acid in the acid activation solution, the concentration of sulphuric acid should be in the range of 10 to 35% by weight sulphuric acid and generally at a sulphuric acid concentration in the range of 15 to 25% by weight. To achieve the full advantage of the present invention when sulphuric acid is used in the acid activating solution, the sulphuric acid should be included at a concentration of 18 to 22% by weight sulphuric acid with best results being achieved at a sulphuric acid concentration of about 20% by weight.

The initial temperature of the acid activation solution is largely determined by the heat of dilution of the acid, but is generally in the range of about 25° to 75° C. More specifically, for sulphuric acid, it has been determined that the initial temperature of the acid activating solution should be in the range of about 50° to 65° C. and for hydrochloric and nitric acids the initial temperature of the acid activation bath should be in the range of about 30° to about 45° C. to achieve good diffusion of the acid into the interstices of the clay particles while fixing the particle size without breakdown or disintegration of the particles. To achieve the full advantage of the present invention, the conditions for the initial contact of the ground clay particles in the acid activating bath should not create steam since the hydration of the clay particles and steam production within the interstices of the clay particles may cause breakdown and disintegration of the clay particles thereby producing a substantial portion of particles having a size less than 5 microns, causing excessive acid activation of the ultra fines, and slower filtration and washing during the process of the present invention.

When the extruded clay pellets are ground prior to acid activation, the ground clay particles are gradually added to the heated acid activation solution at a rate so that the particles are immediately wetted and dispersed in the acid slurry without forming lumps of partially wetted clay particles. Upon contact of the clay particles with the acid activating solution, the acid hardens the clay particles thereby fixing their size and minimizing their dispersion into ultra-fine particles less than 5 microns so that the particle size of the ground or pulverized raw material is maintained throughout the acid digestion period.

In accordance with an important feature of the preferred embodiment of the present invention, the contact of ground or pulverized clay particles with an acid solution, as opposed to initial dispersion of the ground or pulverized material into water and thereafter adding water to the slurry, produces a sandy material having non-sticky surfaces so that the clay particles do not form agglomerates to the extent that ground clay particles would if initially contacted with water. Accordingly, by initial contact of relatively dry, ground clay particles with the acid solution at a concentration of 10-35% by weight acid, the particle size distribution of the clay is substantially fixed in the grinding or pulverizing process thereby substantially eliminating agglomerates of clay having a tendency to slow the steps of acid diffusion, filtration and washing needed in the acid activation process. Acid digestion is completed when approximately 80 to 90% of the acid has been reacted with the clay minerals and this is easily determined by monitoring the residual free acid in the digestion slurry. Acid activation generally is complete in a period of 6 to 8 hours and this can be determined by measuring the free acid in the digestion slurry to determine the extent of reaction with the clay minerals.

When acid activation has been completed, the acid treated clay is separated from a majority of the acid solution and then washed. Both steps of separating the acid treated clay from the acid solution and the washing of the acid treated clay can be achieved in a filter press. In accordance with a preferred embodiment of the present invention, the slurry of acid activated clay in the acid activation solution is pumped, while hot, to a chamber-type filter press having open drainage to extract the acid solution or mother liquor while filling the filter press chambers with the acid activated clay. The flow rate of the acid solution decreases when the chambers of the filter press are filled as a signal to stop the flow of acid activated clay into a filter press and to begin introducing wash water through the filter press. Generally, the filter press chambers are washed with wash water introduced at a pressure of about 20 to 50 pounds per square inch maintained until washing is complete. Washing the acid activated clay removes excess acid, dissolved iron, aluminum, magnesium, and calcium ions and other clay contaminants. The end of the washing step may be determined by monitoring the filtrate from each filtered chamber such as for pH, residual chlorides, and the like to determine when substantially clean water is being removed as a filtrate. Generally, washing is complete when the filtrate has a pH of about 2.5 to about 4 and, to achieve the full advantage of the present invention, the pH of the filtrate water should be in the range of about 3 to 3.5 as an indication that washing of the acid activated clay is complete. If residual chlorides are monitored to determine the completion of clay washing, the chlorides should be at a level of less than about 500 parts per million in the filtrate and preferably less than about 400 parts per million.

In accordance with an important advantage of the present invention, the hardened, pulverized or ground clay materials, rendered non-sticky and porous in the acid-hydration step of the process, results in a relatively porous, non-compacting filter cake having the capacity of much faster filtration and washing under relatively low wash water pressures to achieve more effective diffusion-type washing in the filter press.

In accordance with another important advantage of the process of the present invention, because of the physical nature of the clay particles resulting from the extrusion and acid activation steps, the filtered material retains less water than prior art filtered material when subjected to the same filtering apparatus. For example, in a chamber type filter press, the filter cake, when processed in accordance with the present invention includes about 45 to 55% by weight water compared to filter cakes which contain 60 to 65% by weight water if the same raw material is initially contacted and dispersed in water before adding acid to the slurry.

In accordance with another important advantage of the process of the present invention, the filter cake obtained is hardened and non-sticky so that it is easily charged to a drying apparatus with substantially no agglomeration of fine or recycling to the dryer necessary.

In order to show the new and unexpected results achieved by extruding clay prior to acid-activation compared to clays acid-activated without prior extrusion, a number of different clays were compared for their ability to be filtered rapidly, with and without extrusion prior to acid activation. As shown in the following Table I, extruded and acid-activation clay was compared to acid-activated clay, without extrusion, at various stages of washing for comparison of the filtration rate of the clays:

TABLE 1

|  | Filter Rate ml. oil/min. | Sieve Analysis % Passing | | Moisture |
|---|---|---|---|---|
| ABERDEEN 1 acid activated, washed, dried and ground in lab | 22.0 | 100 200 325 | 97.5% 89.1% 70.5% | 11.33% |
| MALAYSIAN 1 extruded, acid activated, washed, dried and ground in lab | 1.45 | 10.5 200 325 | 100 99.9% 98.8% 88.2% | 12.54% |
| ABERDEEN acid activated and washed in plant; dried and ground in lab | 16.2 | 100 200 325 | 99.9% 98.5% 92.1% | 13.28% |
| ABERDEEN 2.1 acid activated and washed in plant; dried and ground in lab | 23.5 | 100 200 325 | 99.9% 92.1% 70.0% | 15.71% |
| MALAYSIAN 2 extruded, acid activated and washed in plant; dried and ground in lab | 11.5 | 100 200 325 | 99.9% 98.0% 85.1% | 15.98% |
| ABERDEEN 3 acid activated, washed, dried and ground in plant | 22.0 | 100 200 325 | 99.5% 96.2% 85.6% | 13.69% |
| MALAYSIAN 3 extruded, acid activated, washed, dried and ground in plant | 13.7 | 100 200 325 | 99.8% 92.6% 72.2% | 10.96% |
| Competitor's Product acid-activated without extrusions | 12.7 | 100 200 325 | 99.4% 92.6% 82.4% | 16.15% |

The first two materials shown in Table I, Aberdeen 1 and Malaysian 1 were both acid activated, washed and dried and ground in the laboratory. The Malaysian 1 product was extruded in the laboratory and the Aberdeen 1 product was not. The filtration rate, however, for the approximately same sieve analysis, was substantially improved for the extruded material (Malaysian 1) by more than doubling the filtration capacity after extrusion compared to the approximately same material which was not extruded. Comparing the Aberdeen 2 to the Malaysian 2 material, differing only in that the Malaysian 2 was extruded, both being acid-activated and washed in the plant, where the water pressure through the filter press was substantially increased compared to that available in the laboratory, the filtration rate for the extruded material (Malaysian 2) was substantially improved over the Aberdeen 2 material which had not been extruded. A comparison of the materials which were processed start to finish in the plant (Aberdeen 3 vs. Malaysian 3) shows that the filtering characteristics of material that was extruded (Malaysian 3) compared to the material that was not extruded (Aberdeen 3) are most surprising and unexpected in this art.

In order to show the new and unexpected results achieved in color development when acid treated clays are first extruded, prior to acid treatment, paper sheets having a ream weight of forty-five grams per square meter were coated with acid activated montmorillonite clays in an amount of six grams per square meter. The first acid activated montmorillonite clay was first extruded, in accordance with the present invention, prior to acid activation, and the remaining three acid activated montmorillonite clays were acid activated without prior extrusion in accordance with the prior art. Color development was determined by dipping the thus prepared CF paper sheets into toluene solutions of the color formers crystal-violet lactone, benzoyl-leucomethylene blue and paratoluene-sulfonate of michler's hydrol. After drying and storing for ten minutes, the intensity of the color image of the CF sheets were determined by measuring their reflectance. The intensity is the initial color development of imaging. The color intensity is higher in proportion as the reflection is lower. Further, in order to determine the stability against light of the imaged color, the sheets were exposed for two hours to daylight in the xexon radiation test unit of Messers Original-Hanan. The reflection is again measured and termed "fading". The performance of the acid activated bentonites in terms of percent fading and percent imaging are better, the lower the number for both percent fading and percent imaging. The following data in TABLE II show that by extruding the clay prior to acid activation, unexpectedly increased fading and imaging are achieved.

TABLE II

| Acid-Activated Clay | Mean Particle Size of Clay (Microns) | Specific Surface Area (gm/m³) | Brightness | % Fading | % Imaging |
|---|---|---|---|---|---|
| Calcium montmorillonite extruded prior to acid-activation | 2.4 | 320 | 85 | 4 | 5 |
| Calcium montmorillonite w/o prior extrusion (Copisil standard) | 2.4 | 290 | 77 | 7.5 | 6 |
| Calcium montmorillonite w/o prior extrusion (Copisil D4) | 2.5 | 270 | 77 | 7.5 | 6.5 |
| Calcium montmorillonite w/o prior extrusion (copisil) | 2.5 | 270 | 80 | 8 | 8 |

The acid treated clay can be added to the paper at any point during the manufacture so long as the treated clay will remain in the final product and not be lost to the waste water. Generally, the treated clay is added as a step prior to or after calendering the paper, as a coating, to concentrate the treated clay on one major surface. The treated clay coating should form about 0.1 to 10% by weight of the paper, dry basis. To achieve the full advantage of the present invention, the treated clay coating is layered onto a major paper surface in an amount of 0.5 to 5% based on the total weight of the paper and preferably 1 to 3% by weight, dry basis.

It should be understood that the present disclosure has been made only by way of preferred embodiment and that numerous changes in details of construction, combination and arrangement of parts may be resorted to without departing from the spirit and scope of the invention as hereinunder claimed.

What is claimed and sought to be secured by Letters Patent of the United States is:

1. A method of manufacturing paper capable of color development upon application of pressure thereto comprising:
   extruding smectite clay through one or more die openings;
   grinding the clay to a predetermined particle size;
   adding the extruded ground clay to an aqueous acid solution to form a clay slurry;
   agitating the clay slurry for a time sufficient and at a temperature sufficient so that the acid interacts with the clay to form an acid activated clay;
   separating the acid activated clay from a majority of the acid solution;
   washing the acid activated clay with a suitable acid-diluting liquid to remove most of the acid solution from the clay and form a washed, acid activated clay;
   filtering the washed, acid activated clay to remove a portion of the diluting liquid from the clay;
   drying the acid activated clay to a liquid content less than about 20% by weight; and
   adding the extruded, acid activated clay to paper during the manufacture of said paper.

2. The method of claim 1 wherein the extruded and acid activated clay is added as a coating to the paper during manufacture thereof in an amount of 0.1 to 10% based on the total weight of the paper, dry basis.

3. The method of claim 2 wherein the acid activated clay coating is in a amount of 0.5 to 5% based on the total weight of the paper, dry basis.

4. The method of claim 3 wherein the acid activated coating is in an amount of 1 to 3% based on the total weight of the paper, dry basis.

5. The method of claim 1 wherein the acid solution is an aqueous solution of HCl at a concentration of 12 to 25% by weight.

6. The method of claim 1 wherein the acid solution is an aqueous solution of $H_2SO_4$ at a concentration of 10 to 35% by weight.

7. The method of claim 1 including grinding the clay so that least 90% by weight of the ground clay particles have a particle size less than 100 microns.

8. The method of claim 1 including grinding the clay so that least 95% of the clay particles have a particle size of 5 to 100 microns.

9. The method of claim 1 wherein the clay slurry has a clay solids content of 30 to 45% by weight.

10. The method of claim 1 wherein the clay slurry is heated, with agitation, at a temperature of 80° to 100° C. for at least 3 hours.

11. The method of claim 1 wherein the clay is dryed to a moisture content of 10-18% by weight.

12. The method of claim 1 wherein the acid activated lay is separated from the acid solution in a filter press to form a clay cake having a 40 to 50% by weight solids content; the clay cake then is washed with water in the filter press for a time sufficient to achieve a wet clay cake having a pH of 2.5 to 4.0; and thereafter the wet clay cake is further dewatered in the filter press to a solids content of 45 to 55% by weight, prior to drying.

13. The method of claim 1 including grinding the clay to a final particle size distribution wherein at least 80% of the ground clay, on a dry weight basis, passes through a 200 mesh screen, and less than 5%, on a dry weight basis, is finer than 5 microns.

14. The method of claim 1 including grinding the clay to a predetermined, final particle size distribution wherein at least 90% of the ground clay, on a dry weight basis, passes through a 200 mesh screen, and less than 5%, on a dry weight basis, is finer than 5 microns.

15. The method of claim 14 including grinding the clay so that at least 90% by weight of the ground clay particles have a particle size of 5 to 100 microns.

16. The method of claim 14 including grinding the clay so that at least 95% of the clay particles have a particle size of 5 to 100 microns.

* * * * *